United States Patent
Ingrisch et al.

(10) Patent No.: US 6,566,438 B1
(45) Date of Patent: May 20, 2003

(54) HYBRID POLYURETHANE-POLYMER DISPERSION WITH HIGH FILM HARDNESS, METHOD FOR THE PRODUCTION AND THE USE THEREOF

(75) Inventors: Stefan Ingrisch, Seebruck (DE); Alois Maier, Engelsberg (DE); Herbert Winkelmann, Garching (DE); Franz Wolfertstetter, Palling (DE); Alfred Kern, Kirchweidach (DE); Josef Weichmann, Pleiskirchen (DE)

(73) Assignee: SKW Bauchemie GmbH, Trostberg (DE)

( * ) Notice: Subject to any disclaimer, the term of this patent is extended or adjusted under 35 U.S.C. 154(b) by 0 days.

(21) Appl. No.: 09/787,939

(22) PCT Filed: Oct. 27, 1999

(86) PCT No.: PCT/EP99/08132

§ 371 (c)(1), (2), (4) Date: Mar. 22, 2001

(87) PCT Pub. No.: WO00/24798

PCT Pub. Date: May 4, 2000

(30) Foreign Application Priority Data

Oct. 28, 1998 (DE) ......................................... 198 49 702

(51) Int. Cl.$^7$ ............................. C08J 3/00; C08K 3/20; C08L 75/00; C08F 8/30; C08F 283/04
(52) U.S. Cl. ..................... 524/507; 524/589; 524/590; 524/591; 524/839; 524/840; 525/123; 525/128; 525/455
(58) Field of Search ................................ 524/507, 591, 524/839, 840, 589, 590; 525/123, 128, 455

(56) References Cited

U.S. PATENT DOCUMENTS 5,521,246 A * 5/1996 Tien et al.

FOREIGN PATENT DOCUMENTS

| | | |
|---|---|---|
| DE | 41 22 266 | 1/1993 |
| DE | 44 06 547 | 8/1995 |
| EP | 841 357 | 5/1998 |

* cited by examiner

Primary Examiner—Patrick D. Niland
(74) Attorney, Agent, or Firm—Fulbright & Jaworski L.L.P.

(57) ABSTRACT

Described is a polyurethane/polymer hybrid dispersion with high film hardness, which comprises the reaction components (A) from 3 to 25% by weight of a polyol component consisting of
  (i) from 2 to 20% by weight of a relatively high molecular mass polyol component,
  (ii) from 0.5 to 5% by weight of a low molecular mass polyol component,
  (iii) from 0.5 to 3% by weight of a low molecular mass and anionically modifiable polyol component,
(B) from 2 to 20% by weight of a polyisocyanate component,
(C) if desired, from 0 to 6% by weight of a solvent component consisting of
  (i) at least one polyisocyanate-inert organic solvent and/or
  (ii) a polyisocyanate-inert reactive diluent,
(D) from 0.15 to 1.5% by weight of a neutralizing component,
(E) from 0.1 to 1% by weight of a chain extender component,
(F) from 5 to 40% by weight of a monomer component,
(G) from 0.01 to 1.5% by weight of an initiator component, and water as the remainder.

The advantages of the polyurethane/polymer hybrid dispersion of the invention, such as high hardness coupled with high flexibility of the crack-free films, good chemical resistance, great stability of the dispersion within a wide pH range, good freeze/thaw stability, and the use of inexpensive raw materials, are achieved in a simplified synthesis route, without subsequence chemical crosslinking, with a simultaneously low organic solvent content ($\leq$4% by weight), and with good filming at temperatures $\leq$+10° C.

47 Claims, No Drawings

HYBRID POLYURETHANE-POLYMER DISPERSION WITH HIGH FILM HARDNESS, METHOD FOR THE PRODUCTION AND THE USE THEREOF

The present invention relates to an aqueous polyurethane/polymer hybrid dispersion with high film hardness and a low minimum film formation temperature (MFFT), to a process for preparing it and to its use as a binder for one- or two-component coating materials, seals, adhesive bonds, and coatings.

Coating systems based on aqueous polyurethane dispersions and polyurethane/polymer hybrid dispersions have gained increasingly in importance in recent years owing to their good properties such as adhesion to different substrates, abrasion resistance, and also flexibility and touchness. The preparation of aqueous polyurethanes has been known for many years and is described in detail in a great number of publications, e.g., Houben-Weyl, Methoden der organischen Chemie, volume E 20, part I, pp. 1659–1681; D. Dieterich, Prog. Org. Coat. 1981, 9, 281–330; J. W. Rosthauser, K. Nachtkamp, Journal of Coated Fabrics 1986, 16, 39–79; R. Arnoldus, Surf. Coat. 1990, 3 (Waterborne Coat.), 179–98.

The polyurethane/polymer hybrid dispersions, which are more favorable in cost terms than polyurethane dispersions, are particularly suitable for the coating, sealing and adhesive bonding of the surfaces of metallic and mineral substrates and also of woodbase materials and plastics.

The polyurethane/polymer hybrid dispersions represent synergistic combinations of straight polyurethane dispersions and straight polymer dispersions, whose profile of properties cannot be achieved by a simple blending of the two types of dispersion. Polyurethane/polymer hybrid dispersions are based on inter-penetrating networks of polyurethane polymers and acrylic polymers, which may be linked with one another both physically and chemically. This type of dispersion requires specific synthesis methods. Straight polyurethane dispersions are too expensive for numerous building applications. In the polyurethane/polymer hybrid dispersions, therefore, the advantageous properties of the straight polyurethane dispersions are united with the cost advantage of the straight polymer dispersions. For these reasons, the more cost-effective polyurethane/polymer hybrid dispersions are gaining more and more in importance relative to conventional polyurethane dispersions in building applications.

With a view, too, to adherence to existing and future emissions guidelines, considerable efforts have been undertaken in recent years to develop water-based polyurethane/polymer hybrid dispersions containing a very small amount of volatile organic solvents (VOCs, volatile organic compounds). These low-solvent (low-VOC) or solvent-free (zero-VOC) products offer both environmental and economic advantages and already correspond substantially in terms of their performance and materials properties to conventional polyurethane systems.

In chemicals for the building industry, there is a desire—on cost grounds—in particular for polyurethane/polymer hybrid dispersions with high film hardness and good chemical resistance which can be made accessible with the aid of rational and at the same time universal preparation processes.

The hybrid systems known from the relevant patent literature still have a number of disadvantages, which restrict their replacement of polyurethane dispersions in certain applications.

For instance, known preparation processes of polyurethane/polymer hybrid dispersions as described, for example, in the documents EP 0 649 865 A1, EP 0 657 483 A1, EP 0 742 239 A1, and U.S. Pat. No. 5,521,246, are highly complicated with regard to the synthesis procedure.

The patent application EP 0 649 865 A1 discloses a process in which a portion of the acrylate component is added to the prepolymer solution during the polyol/isocyanate reaction. The second portion of the acrylate component is metered in at a later point in time, and the final portion is added to the prepolymer solution prior to dispersion.

In accordance with the patent application EP 0 657 483 A1, the acrylate component is metered in during the actual synthesis of the polyurethane prepolymer at 70° C. in a number of steps. Then, before the polyurethane acrylate prepolymer is dispersed in water, a further portion of the acrylate component is added and the initiator component is added subsequently at 80° C. as it is or in solution in organic solvent.

The U.S. Pat. No. 5,521,246 describes a similar process, in which the acrylate component is again added in steps at 75° C. during the polyurethane prepolymer synthesis. Following neutralization at 25° C. and dispersion in water, the initiator component, dissolved in N-methylpyrrolidone, is supplied. Only then is chain extension carried out with ethylenediamine, and the final portion of the acrylate component is added to the dispersion. The polymerization is conducted for 2 to 3 hours at a temperature of 65° C. Publications on the polymerization of acrylates with 2,2'-azoisobutyro-nitrile are evidence that these conditions are inadequate for complete monomer conversion.

As disclosed in EP 0 742 239 A1 and EP 0 668 300 A1, additional emulsifiers (surfactants) are often necessary in order to ensure sufficient stability of the polyurethane micelles during the polymerization.

High film hardnesses of polyurethane/polymer hybrid dispersions as described in the patent applications EP 0 657 483 A1 and EP 0 668 300 A1 have to date been achieved by means of complicated synthesis processes, by chemical postcrosslinking of the dispersions with corresponding reagents, or, as described in WO 93/24551, by means of polyesterpolyols modified with fatty acid. EP 0 745 625 A1 discloses, for example, a polyurethane dispersion where bisaldimines, which are in equilibrium with the corresponding bisenamines, are incorporated into polyurethane prepolymers by way of amino groups and, as a result, the film hardness of the resulting polyurethane dispersions is increased. In the aforementioned documents, moreover, high film hardnesses are often achieved only with hybrid dispersions, which because of their complicated synthesis contain relatively large amounts of organic solvents ($\geq 10\%$ by weight) and have a minimum film formation temperature of $\geq 20°$ C.

It was an aim of the present invention to develop a low-solvent polyurethane/polymer hybrid dispersion with high film hardness, good chemical resistance and low minimum film formation temperature, said dispersion not having the aforementioned disadvantages of the prior art and at the same time being preparable cost-effectively by a simple synthesis route.

This object has been achieved in accordance with the invention by the provision of an aqueous polyurethane/polymer hybrid dispersion with high film hardness, obtainable by reacting the reaction components (A) to (G) specified below. The dispersion accordingly comprises as reaction components (A) from 3 to 25% by weight of a polyol component consisting of (i) from 2 to 20% by weight of a high molecular mass polyol having two or more polyisocyanate-reactive hydroxyl groups and a molar mass of from 500 to 4000 daltons, (ii) from 0.5 to 5% by weight of a low molecular mass polyol having two or more polyisocyanate-reactive hydroxyl groups and a molar mass of from 50 to 500 daltons, (iii) from 0.5 to 3% by weight of a low molecular mass, anionically modifiable polyol having two or more polyisocyanate-reactive hydroxyl groups and also one or more polyisocyanate-inert carboxyl groups and a molar mass of from 100 to 200 daltons, (B) from 2 to 20% by weight of a polyisocyanate component consisting of one or more polyisocyanates, polyisocyanate homologs or polyisocyanate derivatives having two or more aliphatic and/or aromatic Isocyanate groups, (C) if desired, from 0 to 6% by weight of a solvent component consisting of
(i) at least one polyisocyanate-inert organic solvent which following the preparation of the polyurethane/polymer hybrid dispersion may remain therein or may be removed in part or in whole by distillation, and/or
(ii) at least one polyisocyanate-inert reactive diluent consisting of at least one polyisocyanate-inert organic compound having one or more free-radically polymerizable double bonds, (D) from 0.15 to 1.5% by weight of a neutralizing component consisting of at least one organic or inorganic base, (E) from 0.1 to 1% by weight of a chain extender component consisting of one or more polyamines having two or more polyisocyanate-reactive amino groups, (F) from 5 to 40% by weight of a monomer component consisting of one or more monomers having one or more free-radically polymerizable double bonds, (G) from 0.01 to 1.5% by weight of an initiator component consisting of at least one lipophilic free-radical initiator which preferably has a half-life of 1 hour with a decomposition temperature within the range from 40 to 120° C., and water as the remainder.

It has surprisingly been found that the polyurethane/polymer hybrid dispersion of the invention possesses very good performance properties such as high film hardness and chemical resistance and also an excellent stability of the dispersion and freeze/thaw stability.

The polyol component (A) for the synthesis of the polyurethane/polymer hybrid dispersion proposed in accordance with the invention, with a fraction of preferably from 2 to 25% by weight, based on the overall weight of components (A) to (G) with water, consists of the three individual components (A)(i), (A)(ii), and (A)(iii).

Component (A)(i), with a fraction of preferably from 2 to 20% by weight, based on the overall weight of components (A) to (G) with water, consists of at least one relatively high molecular mass polyol having two or more polyisocyanate-reactive hydroxyl groups and an average molar mass (number average $M_n$) of from 500 to 4000 daltons. It may comprise polymeric polyols such as polyalkylene glycols, aliphatic and/or aromatic polyesters, polycaprolactones, polycarbonates, macromonomers, telechelics or epoxy resins, or mixtures thereof. Polyalkylene glycols are obtained from monomers such as ethylene oxide, propylene oxide, butylene oxide and tetrahydrofuran by addition polymerization in the presence of boron trifluoride or by polyaddition onto starter compounds containing reactive hydrogen atoms, such as water, alcohols, amines or bisphenol A. Mixtures of the monomers may also be used simultaneously or in succession. As suitable polyalkylene glycols it is possible, for example, to use polyethylene glycols, polypropylene glycols (e.g. Voranol grades from Dow), mixed polyglycols based on ethylene oxide and propylene oxide, and also polytetramethylene glycols and polytetrahydrofurans (e.g., PolyTHF 2000 from BASF). Aliphatic and/or aromatic polyesterpolyols are obtained by polycondensation reaction and/or polyaddition reaction from dihydric or higher polyhydric alcohols and dibasic or higher polybasic carboxylic acids, carboxylic anhydrides or carboxylic esters. As suitable aliphatic or aromatic polyesters it is possible, for example, to use condensates based on 1,2-ethanediol (ethylene glycol), 1,4-butanediol (1,4-butylene glycol), 1,6-hexanediol (1,6-hexamethylene glycol), and 2,2-dimethyl-1,3-propanediol (neopentyl glycol), and also 1,6-hexanedioic acid (adipic acid) and 1,3-benzenedicarboxylic acid (isophthalic acid) (e.g., Bester grades from Poliolchimica). Polycaprolactones (e.g., Capa grades from Solvay Interox) and polycarbonates (e.g., Desmophen C 200 from Bayer) are further members of the polyester group. The former are obtained by reacting phosgene and/or aliphatic or aromatic carbonates, such as diphenyl carbonate or diethyl carbonate, for example, with dihydric or higher polyhydric alcohols. The latter are prepared by polyaddition of lactones, such as ε-caprolactone, for example, onto starer compounds containing reactive hydrogen atoms, such as water, alcohols, amines or bisphenol A. Also conceivable are synthetic combinations of polyesters, polycaprolactones, and polycarbonates. Likewise suitable are macromonomers, telechelics or epoxy resins. The macromonomers and telechelics comprise polyhydroxy olefins, such as α,ω-dihydroxypolybutadienes, α,β-dihydroxy(meth)acrylic esters, α,ω-dihydroxy(meth)acrylic esters or α,ω-dihydroxypolysiloxanes, for example. The epoxy resins comprise, preferably, derivatives of bisphenol A diglycidyl ether (BADGE). Preference is given to linear difunctional aliphatic or aromatic polyesterpolyols having an average molecular mass (number average $M_n$) of from 1000 to 4000 daltons and in particular from 1000 to 3000 daltons. Particular preference is given to the use of difunctional linear polyesterpolyols based on adipic acid, 1,4-butylene glycol and ethylene glycol.

Components (A)(ii), with a fraction of preferably from 0.5 to 5% by weight based on the overall weight of components (A) to (G) with water, consist of at least one low molecular mass polyol having two or more polyisocyanate-reactive hydroxyl groups and a molar mass of from 50 to 500 daltons. As suitable low molecular mass polyols it is possible, for example, to use 1,2-ethanediol (ethylene glycol), 1,2-propanediol (1,2-propylene glycol), 1,3-propanediol (1,3-propylene glycol), 1,4-butanediol (1,4-butylene glycol), 1,6-hexanediol (1,6-hexamethylene glycol), 2-methyl-1,3-propanediol (trade name MPDiol Glycol® from Arco Chemical), 2,2-dimethyl-1,3-propanediol (neopentyl glycol), 1,4-bis(hydroxymethyl)cyclohexane (cyclohexanedimethanol), 1,2,3-propanetriol (glycerol), 2-hydroxymethyl-2-methyl-1,3-propanol (trimethylolethane), 2-ethyl-2-hydroxymethyl-1,3-propanediol (trimethylolpropane), and 2,2-bis(hydroxymethyl)-1,3-propanediol (pentaerythritol). Preference is given to using 1,4-butylene glycol, or 1,4-butylene glycol in combination with trimethylolpropane.

Component (A)(iii), with a fraction of preferably 0.5 to 3% by weight based on the overall weight of components (A) to (G) with water, consists of at least one low molecular mass and anionically modifiable polyol having two or more polyisocyanate-reactive hydroxyl groups and one or more polyisocyanate-inert carboxyl groups some or all of which may be converted into carboxylate groups in the presence of bases. As low molecular mass and anionically modifiable polyols having a molecular mass of from 100 to 200 daltons it is possible, for example, to use 2-hydroxymethyl-3-hydroxypropanoic acid (dimethylolacetic acid), 2-hydroxymethyl-2-methyl-3-hydroxypropanoic acid (dimethylolpropionic acid), 2-hydroxymethyl-2-ethyl-3-hydroxypropanoic acid (dimethylolbutyric acid), 2-hydroxymethyl-2-propyl-3-hydroxypropanoic acid (dimethylolvaleric acid), citric acid, and tartaric acid. Preference is given to the use of bishydroxyalkanecarboxylic acids, and preferably 2-hydroxymethyl-2-methyl-3-hydroxypropanoic acid, or dimethylolpropionic acid (trade name DMPA® from Mallinckrodt).

The polyisocyanate component (B), with a fraction of preferably from 2 to 20% by weight based on the overall weight of components (A) to (G) with water, consists of at least one polyisocyanate, polyisocyanate derivative or polyisocyanate homolog having two or more aliphatic and/or aromatic isocyanate groups. Particularly suitable components are the polyisocyanates which are amply known in polyurethane chemistry, or combinations thereof. As suitable aliphatic polyisocyanates it is possible, for example, to use 1,6-diisocyanatohexane (HDI), 1-isocyanato-5-isocyanatomethyl-3,3,5-trimethyl-cyclohexane (IPDI), bis(4-isocyanatocyclohexyl)methane ($H_{12}$MDI), 1,3-bis(1-isocyanato-1-methylethyl)benzene (m-TMXDI), and technical isomer mixtures of the individual aromatic polyisocyanates. As suitable aromatic polyisocyanates it is possible, for example, to use 2,4-diisocyanatotoluene (TDI), bis(4-isocyanato-phenyl)methane (MDI) and, if desired, its higher homologs (polymeric MDI), and technical isomer mixtures of the individual aromatic polyisocyanates. Also suitable in principle, furthermore, are the products termed "paint polyisocyanates" based on bis(4-isocyanatocyclohexyl)methane ($H_{12}$MDI), 1,6-diisocyanato-hexane (HDI), and 1-isocyanato-5-isocyanatomethyl-3,3,5-trimethylcyclohexane (IPDI). The term "paint polyisocyanates" characterizes derivatives of these diisocyanates which contain allophanate, biuret, carbodimide, isocyanurate, uretdione or urethane groups and in which the residual monomeric diisocyanate content has been reduced to a minimum in accordance with the state of the art. In addition it is also possible to use modified polyisocyanates as well, obtainable, for example, by hydrophilic modification of "paint polyisocyanates" based on 1,6-diisocyanatohexane (HDI). The aliphatic polyisocyanates are preferred over the aromatic polyisocyanates. Furthermore, polyisocyanates containing isocyanate groups of different reactivity are preferred. In particular, isophorone diisocyanate, or 1-isocyanato-5-isocyanatomethyl-3,3,5-trimethylcyclohexane, and/or its technical isomer mixtures, are used.

The optionally present solvent component (C)(i), with a fraction of preferably up to 6% by weight based on the overall weight of components (A) to (G) with water, consists of at least one polyisocyanate-inert solvent which is preferably miscible partly or fully with water and which, following the preparation, may remain in the polyurethane dispersion or may be removed in whole or in part by distillation. Examples of suitable solvents are high-boiling and hydrophilic organic solvents such as N-methylpyrrolidone, diethylene glycol dimethyl ether, dipropylene glycol dimethyl ether (Proglyde DMM® from Dow), low-boiling solvents such as acetone, butanone or any desired mixtures thereof. Preference is given to using a high-boiling and hydrophilic solvent such as N-methylpyrrolidone which following the preparation remains in the dispersion and may act as a coalescence aid.

The optionally present solvent component (C)(ii), with a fraction of preferably up to 6% by weight based on the overall weight of components (A) to (G) with water, is composed of at least one polyisocyanate-inert reactive diluent consisting of at least one polyisocyanate-inert organic compound (such as polyethylene glycol, for example) which contains one or more free-radically polymerizable double bonds. Examples of suitable solvents are derivatives of acrylic acid such as methoxypolyethylene glycol methacrylates, polyethylene glycol dimethacrylates, methyl methacrylate, n-butyl acrylate, methyl acrylate, acetoacetoxyethyl methacrylate, or polyethylene glycol methyl vinyl ether, N-vinylimidazole and N-vinyl-pyrrolidone. It is preferred to use methoxypolyethylene glycol methacrylates having from 2 to 20 ethylene glycol units, and methacrylates.

The neutralizing component (D), with a fraction of preferably from 0.15 to 1.5% by weight based on the overall weight of components (A) to (G) with water, consists of one or more organic and/or inorganic bases which are used for the complete or partial neutralization of carboxyl groups of component (A)(ii). As suitable bases it is possible to use tertiary amines such as N,N-dimethylethanolamine, N-methyl-diethanolamine, N-methyldiisopropanolamine, dimethyl-isopropanolamine, N-methylmorpholine, N-ethylmorpholine, triethanolamine, triethylamine, triisopropyl-amine, ammonia or alkali metal hydroxides such as lithium hydroxide, sodium hydroxide, and potassium hydroxide. It is preferred to use tertiary amines and, in particular, triethylamine.

Using the neutralizing component (D), a direct and/or indirect neutralization, i.e., an anionic modification, of the polyurethane prepolymers is undertaken before and/or during dispersion. During the neutralization, carboxylate groups are formed from the carboxyl groups and are used for anionic modification of the polyurethane dispersion and polyurethane base dispersion and of the polyurethane/polymer hybrid dispersion prepared therefrom.

The chain extender component (E), with a fraction of preferably from 0.1 to 1% by weight based on the overall weight of components (A) to (G) with water, consists of at least one polyamine having two or more polyisocyanate-reactive amino groups. Examples of suitable polyamines are adipic dihydrazide, ethylene-diamine, diethylenetriamine, triethylenetetramine, tetraethylenepentamine, pentaethylenehexamine, dipropylenetriamine, hexamethylenediamine, hydrazine, isophoronediamine, N-(2-aminoethyl)-2-aminoethanol, adducts of salts of 2-acrylamido-2-methylpropane-1-sulfonic acid (AMPS) and ethylenediamine, or any desired combinations of these polyamines. It is preferred to use difunctional primary amines and, in particular, 1,2-diaminoethane (ethylenediamine). The chain extension of the polyurethane prepolymer dispersion leads to an increase in the molecular mass within the micelles and to the formation of a polyurethane polyurea dispersion of high molecular mass. The reactive isocyanate groups react substantially more quickly with the chain extender component than with water. The isocyanate groups of the polyurethane prepolymers are converted into urea groups. Subsequently, any remaining free isocyanate groups are fully chain-extended with water. In one preferred embodiment, component (E) contains from 20 to 80% by weight, in particular 50% by weight, of dispersion medium (water).

The solids content of the polyurethane polymer consisting of components (A) to (E) is preferably from 20 to 60% by weight, in particular from 30 to 50% by weight, based on the overall weight of the polyurethane base dispersion prepared initially. The micelles of the polyurethane polymer possess a preferred average particle size of from 50 to 500 nm, in particular from 100 to 200 nm. Moreover, the polyurethane polymer has an average molar mass of preferably from 25,000 to 100,000 daltons.

The monomer component (F), with a fraction of preferably from 5 to 40% by weight based on the overall weight of components (A) to (G) with water, consists of one or more monomers having one or more free-radically polymerizable double bonds. Examples of suitable monomers are derivatives of acrylic acid such as methacrylic acid, methacrylic anhydride, methacrylonitrile, methacrylamide, methyl methacrylate, ethyl methacrylate, n-butyl methacrylate, i-butyl methacrylate, n-hexyl methacrylate, cyclohexyl methacrylate, 2-ethylhexyl methacrylate, isobornyl methacrylate, benzyl methacrylate, 2-hydroxyethyl methacrylate, hydroxypropyl methacrylate, 2-hydroxyethyl acrylate, hydroxypropyl acrylate, 2-dimethylaminoethyl methacrylate, ethyl triglycol methacrylate, tetrahydrofurfuryl methacrylate, methacrylic anhydride, allyl methacrylate, ethylene glycol dimethacrylate, diethylene glycol dimethacrylate, triethylene glycol dimethacrylate, tetraethylene glycol dimethacrylate, polyethylene glycol 400 dimethacrylate, 1,3-butanediol dimethacrylate, 1,4-butanediol dimethacrylate, 1,6-hexanediol dimethacrylate, methyl acrylate, n-butyl acrylate, n-hexyl acrylate, n-octyl acrylate, n-octyl methacrylate, acrylic acid, acetoacetoxyethyl methacrylate, acrylamide, N-butoxymethylmethacrylamide, N-isobutoxymethylmethacrylamide, 2-acrylamido-2-methyl-propane-1-sulfonic acid (AMPS), methoxypolyethylene glycol methacrylates, methoxypolyethylene glycol acrylates, polyethylene glycol dimethacrylates or styrene derivatives such as styrene, methylstyrene, and ethylstyrene. It is preferred to use acrylic acid (propenoic acid) and its derivatives and/or methacrylic acid (2-methylpropenoic acid) and its derivatives and/or styrene and its derivatives, e.g., mixtures of methyl methacrylate, n-butyl acrylate, and styrene. Preference is also given to using combinations of from 75 to 85% by weight methyl methacrylate, from 5 to 15% by weight n-butyl acrylate and, if desired, up to 20% by weight further monomers, particular preference being given to using combinations of 85% by weight methyl methacrylate and 15% by weight n-butyl acrylate or of 75% by weight methyl methacrylate, 15% by weight n-butyl acrylate, and 10% by weight styrene.

The initiator component (G), with a fraction of preferably from 0.01 to 1.5% by weight based on the overall weight of components (A) to (G) with water, consists of at least one lipophilic free-radical initiator which preferably has a half-life of one hour at a decomposition temperature within the range from 40 to 120° C.; i.e., within the range from 40 to 120° C. there exists a temperature at which the initiator used undergoes decomposition by 50% within one hour. Examples of suitable initiators are peroxide initiators such as dilauroyl peroxide, dibenzoyl peroxide, tert-amyl peroxyneodecanoate, tert-butyl peroxyneodecanoate, tert-butyl peroxypivalate, 2,5-dimethyl-2,5-di(2-ethylhexanoylperoxy)hexane, tert-amyl peroxy-2-ethylhexanoate, tert-butyl peroxy-2-ethylhexanoate, tert-amyl peroxybenzoate, tert-butyl peroxybenzoate, persulfate initiators such as ammonium peroxodisulfate, sodium peroxodisulfate, potassium peroxodisulfate, azo initiators such as 2,2'-azobis(2-cyclopropylpropionitrile), 2,2'-azobis(2,4-dimethylvaleronitrile), 2,2'-azobis(2-methylbutyronitrile), 2,2'-azobis(2-methyl-propionitrile), and 1,1'-azobis(cyclohexane-1-carbonitrile). Preference is given to using free-radical initiators having one or more azo or peroxo groups and a half-life of one hour at a decomposition temperature of from 70 to 90° C. Particular preference is given to the use of 2,2'-azobis(2-methylpropionitrile), or 2,2'-azoisobutyronitrile The solids content in the polyurethane/polymer hybrid dispersion comprising components (A) to (G) with water is preferably from 20 to 60% by weight, with particular preference form 30 to 50% by weight, based on the overall weight of the polyurethane/polymer hybrid dispersion. In this case the ratio of the fractional solids contents of polyurethane resin and polymer resin is in particular from 20 to 80 from 80 to 20% by weight, preferably from 40 to 60:60 to 40% by weight, and with particular preference 50:50% by weight.

The average particle sizes of the micelles of the polyurethane hybrid polymer are preferably from 50 to 500 nm, in particular from 50 to 250 nm. The polyurethane hybrid polymer possesses a preferred average molar mass of from 25,000 to 250,000 daltons.

The invention further provides a process for preparing the polyurethane/polymer hybrid dispersion of the invention, which comprises first preparing in reaction stage (a) a polyurethane base dispersion by (a1) reacting the polyol components (A)(i), (A)(ii), and (A)(iii) with the polyisocyanate component (B) in the presence or absence of solvent component (C) and in the presence or absence of a catalyst, to give a polyurethane prepolymer, (a2) transferring the polyurethane prepolymer from stage (a1) to the dispersion medium, water, and neutralizing it directly or indirectly using the neutralizing component (D), and subsequently (a3) reacting the polyurethane prepolymer dispersion from stage (a2) with the chain extender component (E), which has been dissolved in fractions of the dispersion medium removed prior to the addition, and then, in reaction stage (b), preparing a polyurethane/polymer hybrid dispersion by (b1) adding to the polyurethane base dispersion from stage (a3) a preprepared mixture of monomer component (F) and initiator component (G), and subsequently (b2) by means of the thermal decomposition of component (G), conducting a free-radical polymerization of component (F) within the micelles of the polyurethane base dispersion.

In order to prepare the polyurethane/polymer hybrid dispersion of the invention, in reaction stage (a) a polyurethane base dispersion is prepared by means of a prepolymer mixing process using the techniques customary in polyurethane chemistry. For this purpose, in step (a1) of the process, preferably from 3 to 25% by weight of the relatively high molecular mass polyol component (A)(i), preferably from 0.5 to 5% by weight of the low molecular mass polyol component (A)(ii), and preferably from 0.5 to 3% by weight of the low molecular mass and anionically modifiable polyol (A)(iii) are reacted with preferably from 2 to 20% by weight of polyisocyanate component (B) in the presence or absence of from 0 to 6% by weight of solvent component (C) at a temperature of preferably from 60 to 120° C., with particular preference from 80 to 100° C., to give a polyurethane prepolymer. The NCO/OH equivalents ratio of components (A) and (B) here is preferably from 1.2 to 2.0 with particular preference from 1.4 to 1.8. The polyurethane prepolymer may if desired be prepared in the presence of from 0.01 to 1% by weight, based on components (A), (B), and (C), of a catalyst customary for polyaddition reactions onto polyisocyanates.

The resulting polyurethane prepolymer from stage (a1) is transferred in step (a2) of the process into the dispersion medium, water, which preferably contains neutralizing component (D) for an indirect neutralization. The prepolymer is transferred preferably at a temperature of from 30 to 60° C., in particular from 30 to 50° C., to the dispersion medium, water, which then contains preferably from 0.15 to 1.5% by weight of the component (D) needed for the neutralization. In the case of a direct neutralization, however, the neutralizing component (D) may be stirred into the polyurethane prepolymer as early as after reaction stage (a1). The neutralizing component is preferably added in an amount such that the degree of neutralization, based on the free carboxyl groups of the polyurethane prepolymer, is from 70 to 100 equivalent %, in particular form 90 to 100 equivalent %.

Subsequently, in stage (a3) of the process, the polyurethane prepolymer dispersion from stage (a2) is reacted with preferably from 0.1 to 1% by weight of the component (E) needed for chain extension, which is preferably in dissolved form, e.g. dissolved in fractions of the dispersion medium removed prior to the addition, at temperatures of preferably from 20 to 60° C., in particular from 30 to 50° C., with component (E) containing preferably from 20 to 80% by weight, in particular 50% by weight, of dispersion medium. The chain extender component (E) is preferably in an amount such that the degree of chain extension, based on the free isocyanate groups of the polyurethane prepolymer, is from 50 to 100 equivalent %, in particular from 60 to 90 equivalent %.

The polyurethane base dispersion obtained in step (a3) she process is then used to prepare the polyurethane/polymer hybrid dispersion in stage (b). In step (b1) of the process, the polyurethane base dispersion from stage (a3) has added to it a preprepared mixture of preferably from 5 to 40% by weight of monomer component (F) and preferably from 0.01 to 1.5% by weight of initiator component (G) at a temperature for preferably from 15 to 35° C., in particular from 20 to 30° C. Subsequently, in step (b2) of the process, the dispersion is heated and, by means of the thermal decomposition of component (G), a free-radical polymerization of component (F) is conducted within the micelles of the polyurethane base dispersion. Reaction stage (b2) is conducted preferably at a temperature which lies within a range of ±10° C. based on the temperature at which component (G) has a half-life of one hour. When 2,2'-azobisisobutyronitrile or 2,2'-azobis(2-methylpropionitrile) is used as component (G), reaction stage (b2) is conducted preferably at a temperature of 80±10° C. In one preferred embodiment, the initiator/monomer molar ratio of components (F) and (G) is set in the range from 0.001 to 0.05 mol %, preferably at 0.008 mol %. After the end of polymerization, the ready polyurethane/polymer hybrid dispersion is cooled and filtered.

The advantage of this method of preparation is that monomers and initiator can be added together at room temperature and that their stabilization in the polyurethane dispersion does not necessitate any additional emulsifiers (surfactants) at all. The charge density of the polyurethane micelles is sufficiently great to ensure the polymerization of the monomers within the micelles without emulsifiers—by virtue of their stability alone. The stability of the polyurethane/polymer hybrid micelles is retained for a long period even after polymerization has come to an end, without further stabilizing additions. Experience suggests that when the prepolymer mixing process is used small amounts of by-products are formed which are not adequately stabilized in the polyurethane dispersion and which therefore sediment in the form of fine needles. These by-products have to be separated from the dispersion, laboriously, over fine filters. Surprisingly, diluting the chain extender with portions of the dispersion medium makes it possible to suppress this effect completely.

In comparison to the products known from the prior art, the polyurethane/polymer hybrid dispersion of the invention is less complicated in terms of its process, much less complicated in its material composition, and, accordingly, represents a cost-effective binder for building applications, whose performance and material properties match or exceed those of commercially available products.

The polyurethane dispersion of the invention is outstandingly suitable as a binder for one- or two-component coating materials, seals, adhesive bonds and coatings on the surfaces of mineral building materials, such as concrete, wood and woodbase materials, metal, and plastics, for example.

The advantages of the polyurethane/polymer hybrid dispersion of the invention, such as high hardness coupled with high flexibility of the crack-free films, good chemical resistance, great stability of the dispersion within a wide pH range, good freeze/thaw stability, and the use of inexpensive raw materials, are achieved in a simplified synthesis route, without subsequent chemical crosslinking, with a simultaneously low organic solvent content ($\leq 4\%$ by weight), and with good filming at temperatures $\leq +10°$ C.

The examples which follow are intended to illustrate the invention in more detail.

EXAMPLE 1

Preparation of the Polyurethane Base Dispersion Variant A (Without Trimethylolpropane)

A four-necked flask equipped with KPG stirrer, reflux condenser, thermometer and nitrogen blanketing was charged with 102.2 g of isophorone diisocyanate, and half the amount of a preprepared polyol mixture consisting of 100.00 g of a polyesterpolyol (trade name: B 42H from Poliolchimica), 15.00 g of 1,4-butane-diol (from Aldrich), 15.00 g of dimethylolpropionic acid (trade name: DMPA® from Mallinckrodt) and 50.00 g of N-methylpyrrolidone (from Aldrich) was added. The mixture was stirred under nitrogen blanketing at from 80 to 90° C. until the exothermic reaction subsided. Following the addition of the second half of the polyol mixture, stirring was continued under nitrogen blanketing at from 80 to 90° C. until the calculated NCO content was reached (NCO/OH=1.40). The course of the reaction was monitored by acidimetry. After the end of the polyaddition reaction, an NCO content of 3.91% by weight (theory: 3.88% by weight) was found. 250.00 g of the prepolymer were then dispersed with intensive stirring in a mixture of 333.34 g of demineralized water and 10.06 g of triethylamine (100 mol %) (indirect neutralization). To build up the polyurethane dispersion, it was chain-extended with a mixture of 4.66 g of ethylenediamine (70 equivalent %) and 4.66 g of demineralized water.

A stable polyurethane dispersion was obtained having the following characteristics:

| | |
|---|---|
| Appearance | semitranslucent |
| Solids content | 35% by weight |
| pH | 7.30 |
| König hardness | 125 s (after 7 days' drying) |
| NMP content (calculated) | 7.4% by weight |

Variant B (With Trimethylolpropane)

A four-necked flask equipped with KPG stirrer, reflux condenser, thermometer and nitrogen blanketing was charged with 105.0 g of isophorone diisocyanate, and half the amount of a prepreparated polyol mixture consisting of 100.00 g of a polyesterpolyol (trade name: B 42H from Poliolchimica), 15.00 g of 1,4-butane-diol (from Aldrich), 15.00 g of dimethylolpropionic acid (trade name: DMPA® from Mallinckrodt), 1.00 g of trimethylolpropane (from Aldrich) and 50.00 g of N-methylpyrrolidone (from Aldrich) was added. The mixture was starred under nitrogen blanketing at from 80 to 90° C. until the exothermic reaction subsided. Following the addition of the second half of the polyol mixture, stirring was continued under nitrogen blanketing at from 80 to 90° C. until the calculated NCO content was reached (NCO/OH=1.40). The course of the reaction was monitored by acidimetry. After the end of the polyaddition reaction, an NCO content of 4.12% by weight (theory: 3.66% by weight) was found. 250.00 g of the prepolymer were then dispersed with intensive stirring in a mixture of 333.42 g of demineralized water and 9.88 g of triethylamine (100 mol %) (indirect neutralization). To build up the polyurethane dispersion, it was chain-extended with a mixture of 4.53 g of ethylenediamine (70 equivalent %) and 4.58 g of demineralized water.

A stable polyurethane dispersion was obtained having the following characteristics:

Polyurethane/polymer Hybrid Dispersion with High Hardness

The polyurethane/polymer hybrid dispersions were prepared using in each case one of the polyurethane dispersions presented in Example 1 (variants A to D) as the matrix for the emulsion polymerization of the olefinic monomers.

The hybridization step ran as follows:

EXAMPLE 2

| | | |
|---|---|---|
| 1. | Polyurethane dispersion (Example 1 A) | 300.00 g |
| 2. | Demineralized water | 122.00 g |
| 3. | Aqueous ammonia solution (25% strength) | 2.0 ml |
| 4. | n-Butyl acrylate (BA) | 15.75 g |
| 5. | Methyl methacrylate (MMA) | 89.25 g |
| 6. | 2,2'-Azoisobutyronitrile (AIBN) | 1.33 g |

The polyurethane dispersion (1) was charged at room temperature to the reaction vessel and was diluted with water (2) with uniform stirring. Aqueous ammonia solution (3) was added until a pH of approximately 8.0 was reached. n-Butyl acrylate (4), methyl methacrylate (5) and 2,2'-azoisobutyronitrile (6), separately, were mixed thoroughly in a vessel at room temperature and the mixture was added to the polyurethane dispersion over a period of from 90 to 120 minutes. Following complete addition of the monomer/initiator solution, the dispersion was heated to from 80 to 82° C. and held at this temperature for 5 hours. The dispersion was subsequently cooled to 25° C. and filtered through a filter (pore size 80 $\mu$m). This gave a fine, opaque hybrid dispersion having a solids content of approximately 39% by weight.

EXAMPLE 3

The hybridization step ran in analogy to the procedure described in Example 2. The substances used are listed in the following table:

| Variant C and D (analogous to procedure B) | | | |
|---|---|---|---|
| | Variant B | Variant C | Variant D |
| Polyesterpolyol Bester 42 H (OH number: 56.1 mg KOH g$^{-1}$) | 100.00 g | 100.00 g | 100.00 g |
| 1,4-Butanediol (BD14) | 15.00 g | 15.00 g | 15.00 g |
| Trimethylolpropane (TMP) | 1.00 g | 1.50 g | 15.00 g |
| Dimethylolpropionic acid (DMPA ®) | 15.00 g | 15.00 g | 15.00 g |
| N-Methylpyrrolidone (NMP) | 50.00 g | 50.00 g | 50.00 g |
| Isophorone diisocyanate (IPIDI) | 105.00 g | 106.10 g | 107.30 g |
| NCO/OH | 1.40 | 1.40 | 1.40 |
| Prepolymer | 250.00 g | 250.00 g | 250.00 g |
| Demineralized water | 333.42 g | 333.18 g | 333.37 g |
| Triethylamine (TEA) | 9.88 g | 9.83 g | 9.77 g |
| Ethylenediamine (EDA) | 4.58 g | 4.82 g | 4.62 g |
| Demin. water for 1:1 dilution with EDA | 4.58 g | 4.82 g | 4.63 g |
| NCO content, theory/found | 3.88/4.12 | 3.98/3.85 | 4.00/3.70 |
| Appearance | semi-translucent | semi-translucent | semi-translucent |
| Solids content | 35% by wt. | 35% by wt. | 35% by wt. |
| pH | 7.30 | 7.25 | 7.28 |
| König hardness (after 7 days) to DIN 53157 | 130 s | 135 s | 135 s |

| | | |
|---|---|---|
| 1. | Polyurethane dispersion (Example 1 B) | 300.00 g |
| 2. | Demineralized water | 122.00 g |
| 3. | Aqueous ammonia solution (25% strength) | 2.0 ml |
| 4. | n-Butyl acrylate (BA) | 15.75 g |
| 5. | Methyl methacrylate (MMA) | 89.25 g |
| 6. | 2,2'-Azoisobutyronitrile (AIBN) | 1.33 g |

EXAMPLE 4

The hybridization step ran in analogy to the procedure described in Example 2. The substances used are listed in the following table:

| | | |
|---|---|---|
| 1. | Polyurethane dispersion (Example 1 B) | 300.00 g |
| 2. | Demineralized water | 122.00 g |
| 3. | Aqueous ammonia solution (25% strength) | 2.0 ml |
| 4. | n-Butyl acrylate (BA) | 15.75 g |
| 5. | Methyl methacrylate (MMA) | 78.75 g |
| 6. | Styrene | 10.50 g |
| 7. | 2,2'-Azoisobutyronitrile (AIBN) | 1.33 g |

EXAMPLE 5

The hybridization step ran in analogy to the procedure described in Example 2. The substances used are listed in the following table:

| | | |
|---|---|---|
| 1. | Polyurethane dispersion (Example 1 C) | 300.00 g |
| 2. | Demineralized water | 122.00 g |
| 3. | Aqueous ammonia solution (25% strength) | 2.0 ml |
| 4. | n-Butyl acrylate (BA) | 8.40 g |
| 5. | Methyl methacrylate (MMA) | 96.6 g |
| 6. | 2,2'-Azoisobutyronitrile (AIBN) | 1.35 g |

EXAMPLE 6

The hybridization step ran in analogy to the procedure described in Example 2. The substances used are listed in the following table:

| | | |
|---|---|---|
| 1. | Polyurethane dispersion (Example 1 C) | 300.00 g |
| 2. | Demineralized water | 122.00 g |
| 3. | Aqueous ammonia solution (25% strength) | 2.0 ml |
| 4. | n-Butyl acrylate (BA) | 15.75 g |
| 5. | Methyl methacrylate (MMA) | 89.25 g |
| 6. | 2,2'-Azoisobutyronitrile (AIBN) | 1.33 g |

EXAMPLE 7

The hybridization step ran in analogy to the procedure described in Example 2. The substances used are listed in the following table:

| | | |
|---|---|---|
| 1. | Polyurethane dispersion (Example 1 B) | 300.00 g |
| 2. | Demineralized water | 122.00 g |
| 3. | Aqueous ammonia solution (25% strength) | 2.0 ml |
| 4. | n-Butyl acrylate (BA) | 10.50 g |

-continued

| | | |
|---|---|---|
| 5. | Methyl methacrylate (MMA) | 84.00 g |
| 6. | Styrene | 10.50 g |
| 7. | 2,2'-Azoisobutyronitrile (AIBN) | 1.34 g |

EXAMPLE 8

The hybridization step ran in analogy to the procedure described in Example 2. The substances used are listed in the following table:

| | | |
|---|---|---|
| 1. | Polyurethane dispersion (Example 1 D) | 300.00 g |
| 2. | Demineralized water | 122.00 g |
| 3. | Aqueous ammonia solution (25% strength) | 2.0 ml |
| 4. | n-Butyl acrylate (BA) | 15.75 g |
| 5. | Methyl methacrylate (MMA) | 89.25 g |
| 6. | 2,2'-Azoisobutyronitrile (AIBN) | 1.33 g |

The polyurethane/polymer hybrid dispersions had the following characteristics:

| | Appearance | Solids content (% by weight) | Viscosity (mPas s) spindle 1, 60 rpm | pH | König hardness (s) after 7 days to DIN 53 157 |
|---|---|---|---|---|---|
| Ex. 2 | milky white liquid | 40 | 33 | 8.0 | 95 |
| Ex. 3 | milky white liquid | 40 | 73 | 8.0 | 146 |
| Ex. 4 | milky white liquid | 40 | 75 | 8.0 | 141 |
| Ex. 5 | milky white liquid | 40 | 60 | 8.0 | 153 |
| Ex. 6 | milky white liquid | 40 | 58 | 8.0 | 162 |
| Ex. 7 | milky white liquid | 40 | 64 | 8.0 | 137 |
| Ex. 8 | milky white liquid | 40 | 72 | 8.0 | 163 |
| Alberdingk Boley UC100 | milky white liquid | 42 | 50 | 7–8 | 90 |
| Zeneca Resins Neo Pac E-121 | milky white liquid | 35 | 70 | 8.0 | 135 |

What is claimed is:
1. A polyurethane/polymer hybrid dispersion with high film hardness comprising:
(A) from 3 to 25% by weight of a polyol component comprising
(i) from 2 to 20% by weight of a high molecular mass polyol having two or more polyisocyanate-reactive hydroxyl groups and a molar mass of from 500 to 4000 daltons, and
(ii) from 0.5 to 5% by weight of a low molecular mass polyol having two or more polyisocyanate-reactive hydroxyl groups and a molar mass of from 50 to 500 daltons;
(iii) from 0.5 to 3% by weight of a low molecular mass, anionically modifiable polyol having two or more polyisocyanate-reactive hydroxyl groups and also one or more polyisocyanate-inert carboxyl groups and a molar mass of from 100 to 200 daltons,
(B) from 2 to 20% by weight of a polyisocyanate component comprising one or more polyisocyanates, polyisocyanate homologs and/or polyisocyanate derivatives having two or more aliphatic and/or aromatic isocyanate groups;

(C) from 0 to 6% by weight of a solvent component consisting of
  (i) at least one polyisocyanate-inert organic solvent which following the preparation of the polyurethane/polymer hybrid dispersion may remain therein or may be removed in part or in whole by distillation, and/or
  (ii) at least one polyisocyanate-inert reactive diluent comprising at least one polyisocyanate-inert organic compound having one or more free-radically polymerizable double bonds;
(D) from 0.15 to 1.5% by weight of a neutralizing component comprising at least one organic or inorganic base,
(E) from 0.1 to 1% by weight of a chain extender component comprising one or more polyamines having two or more polyisocyanate-reactive amino groups,
(F) from 5 to 40% by weight of a monomer component comprising one or more monomers having one or more free-radically polymerizable double bonds,
(G) from 0.01 to 1.5% by weight of a free-radical initiator component comprising of at least one lipophilic free-radical initiator and water as the remainder, obtained by first preparing in reaction stage (a) a polyurethane base dispersion by
  (a1) reacting components (A), (B) and (C) in the presence or absence of a catalyst, to give a polyurethane prepolymer,
  (a2) transferring the polyurethane prepolymer from stage (a1) to the dispersion medium, water, and neutralizing it directly or indirectly using the neutralizing component (D), and subsequently
  (a3) reacting the polyurethane prepolymer dispersion from stage (a2) with the chain extender component (E), which has been dissolved in fractions of the dispersion medium removed prior to the addition,
and then in reaction stage (b) preparing a polyurethane/polymer hybrid dispersion by
  (b1) adding to the polyurethane base dispersion from stage (a3) a preprepared mixture of components (F) and (G), and subsequently
  (b2) by means of the thermal decomposition of component (G), conducting a free-radical polymerization of component (F) within the micelles of the polyurethane base dispersion.

2. The polyurethane/polymer hybrid dispersion as claimed in claim 1, wherein component (A)(i) comprises linear difunctional polyesterpolyols having a molar mass of from 1000 to 4000 daltons.

3. The polyurethane/polymer hybrid dispersion as claimed in claim 1, wherein component (A)(i) comprises difunctional polyesterpolyols based on adipic acid, 1,4-butylene glycol and ethylene glycol.

4. The polyurethane/polymer hybrid dispersion as claimed in claim 1, wherein component (A)(ii) comprises 1,4-butylene glycol.

5. The polyurethane/polymer hybrid dispersion as claimed in claim 1 wherein component (A)(ii) comprises 1,4-butylene glycol in combination with trimethylolpropane.

6. The polyurethane/polymer hybrid dispersion as claimed in claim 1 wherein component (A)(iii) comprises a bishydroxyalkanecarboxylic acid.

7. The polyurethane/polymer hybrid dispersion as claimed in claim 6, wherein component (A)(iii) comprises dimethylolpropanoic acid.

8. The polyurethane/polymer hybrid dispersion as claimed in claim 1 wherein component (B) comprises isophorone diisocyanate.

9. The polyurethane/polymer hybrid dispersion as claimed in claim 1 wherein solvent component (C)(i) comprises high-boiling and hydrophilic compounds.

10. The polyurethane/polymer hybrid dispersion as claimed in claim 1, wherein solvent component (C)(i) comprises N-methylpyrrolidone.

11. The polyurethane/polymer hybrid dispersion as claimed in claim 1, wherein polyisocyanate-inert reactive diluent (C)(ii) comprises polyethylene glycols having one or more free-radically polymerizable double bonds.

12. The polyurethane/polymer hybrid dispersion as claimed in claim 11, wherein solvent component (C)(ii) comprises methoxypolyethylene glycol methacrylates having from 2 to 20 ethylene glycol units.

13. The polyurethane/polymer hybrid dispersion as claimed in claim 11, wherein the neutralizing component comprises ammonia, tertiary amines, and/or alkali metal hydroxides.

14. The polyurethane/polymer hybrid dispersion as claimed in claim 13, wherein the neutralizing component D comprises triethylamine.

15. The polyurethane/polymer hybrid dispersion as claimed in claim 1, wherein the chain extender component D comprises a difunctional primary amine.

16. The polyurethane/polymer hybrid dispersion as claimed in claim 15 wherein the difunctional primary amine is 1,2-diaminoethane.

17. The polyurethane/polymer hybrid dispersion as claimed in claim 1, wherein component (E) contains from 20 to 80% by weight, preferably 50% by weight, of water as dispersion medium.

18. The polyurethane/polymer hybrid dispersion as claimed in claim 1 wherein the solids content of the polyurethane polymer consisting of components (A) to (E) is from 20 to 60% by weight, preferably from 30 to 50% by weight, based on the overall weight of the polyurethane dispersion.

19. The polyurethane/polymer hybrid dispersion as claimed in claim 1 wherein the average particle size of the micelles of the polyurethane polymer consisting of components (A) to (E) is from 50 to 500 nm, preferably from 100 to 200 nm.

20. The polyurethane/polymer hybrid dispersion as claimed in claim 1 wherein the polyurethane polymer consisting of components (A) to (E) has an average molar mass of from 25,000 to 100,000 daltons.

21. The polyurethane/polymer hybrid dispersion as claimed in claim 1, wherein component (F) is selected from acrylic acid and its derivatives, methacrylic acid and its derivatives, and/or styrene and its derivatives.

22. The polyurethane/polymer hybrid dispersion as claimed in claim 1, wherein component (F) comprises combinations of from 75 to 85% by weight methyl methacrylate, from 5 to 15% by weight n-butyl acrylate and, if desired, up to 20% by weight of further monomers.

23. The polyurethane/polymer hybrid dispersion as claimed in claim 1, wherein component (F) comprises a combination of from 85% by weight methyl methacrylate and 15% by weight n-butyl acrylate or a combination of 75% by weight of methyl methacrylate, 15% by weight n-butyl acrylate, and 10% by weight styrene.

24. The polyurethane/polymer hybrid dispersion as claimed in claim 1 wherein component (G) comprises a free-radical initiator having one or more azo or peroxo groups.

25. The polyurethane/polymer hybrid dispersion as claimed in claim 1, wherein component (G) comprises a free-radical initiator having a half-life of 1 hour at a decomposition temperature within the range from 40 to 120° C., preferably from 70 to 90° C.

26. The polyurethane/polymer hybrid dispersion as claimed in claim 1, wherein component (G) comprises 2,2'-azobisisobutyronitrile.

27. The polyurethane/polymer hybrid dispersion as claimed in claim 1, wherein the solids content of the polyurethane hybrid polymer its from 20 to 60% by weight, preferably from 30 to 50% by weight, based on the overall weight of the polyurethane/polymer hybrid dispersion.

28. The polyurethane/polymer hybrid dispersion as claimed in claim 1, wherein the ratio of the fractional solids contents of polyurethane resin and polymer resin is from 20 to 80:from 80 to 20% by weight, preferably from 40 to 60:from 60 to 40% by weight, and with particular preference 50:50% by weight.

29. The polyurethane/polymer hybrid dispersion as claimed in claim 1, wherein the average particle size of the micelles of the polyurethane hybrid polymer is from 50 to 500 nm, preferably from 50 to 250 nm.

30. The polyurethane/polymer hybrid dispersion as claimed in claim 1, wherein the polyurethane hybrid polymer has an average molar mass of from 25,000 to 250,000 daltons.

31. A process for preparing the polyurethane/polymer hybrid dispersion as claimed in claim 1, which comprises first preparing in reaction stage (a) a polyurethane base dispersion by (a1) reacting from 2 to 20% by weight of the high molecular mass polyol component (A)(i), from 0.5 to 5% by weight of the low molecular mass polyol component (A)(ii), and from 0.5 to 3% by weight of the low molecular mass and anionically modifiable polyol (A)(iii) with from 2 to 20% by weight of the polyisocyanate component (B) in the presence of absence of from 0 to 6% by weight of solvent component (C) and in the presence or absence of a catalyst, to give a polyurethane prepolymer, (a2) transferring the polyurethane prepolymer from stage (a1) to the dispersion medium, water, and neutralizing it directly or indirectly using the from 0.15 to 1.5% by weight of neutralizing component, and subsequently (a3) reacting the polyurethane prepolymer dispersion from stage (a2) with the from 0.1 to 1% by weight of chain extender component (E), which has been dissolved in fractions of the dispersion medium removed prior to the addition, and then, in reaction stage (b), preparing a polyurethane/polymer hybrid dispersion by (b1) adding to the polyurethane base dispersion from stage (a3) a prepared mixture of from 5 to 40% by weight of monomer component (F) and from 0.01 to 1.5% by weight of initiator component (G), and subsequently (b2) by means of the thermal decomposition of component (G), conducting a free-radical polymerization of component (F) within the micelles of the polyurethane base dispersion.

32. The process as claimed in claim 31, wherein reaction stage (a1) is conducted at a temperature of from 60 to 120° C., preferably from 80 to 100° C.

33. The process as claimed in claim 31, wherein the NCO/OH equivalents ratio of components (A) and (B) in reaction stage (a1) is set at a value of from 1.2 to 2.0, preferably from 1.4 to 1.8.

34. The process as claimed in claim 31, wherein reaction stage (a1) is conducted in the presence of from 0.01 to 1% by weight, based on components (A), (B), and (C), of a catalyst suitable for polyaddition reactions onto polyisocyanates.

35. The process as claimed in claim 31, wherein component (A)(iii) is neutralized indirectly using in step (a2) a dispersion medium comprising the neutralizing component (D).

36. The process as claimed in claim 31, wherein component (A)(iii) is neutralized directly, the neutralizing component being stirred into the polyurethane prepolymer as early as after reaction stage (a1).

37. The process as claimed in claim 31, wherein reaction stage (a2) is conducted at a temperature of from 30 to 60° C., preferably from 40 to 50° C.

38. The process as claimed in claim 31, wherein component (D) is added in an amount such that the degree of neutralization, based on the free carboxyl groups of the polyurethane prepolymer, is from 70 to 100 equivalent %, preferably from 90 to 100 equivalent %.

39. The process as claimed in claim 31, wherein reaction stage (a3) is conducted at a temperature of from 20 to 60° C., preferably from 30 to 50° C.

40. The process as claimed in claim 31, wherein component (E) in reaction stage (a3) is added in solution to the dispersion medium.

41. The process as claimed in claim 31, wherein component (E) is added in an amount such that the degree of chain extension, based on the free isocyanate groups of the polyurethae prepolymer, is from 50 to 100 equivalent %, preferably from 60 to 90 equivalent %.

42. The process as claimed in claim 31, wherein reaction stage (b1) is conducted at a temperature of from 15 to 35° C., preferably from 20 to 30° C.

43. The process as claimed in claim 31, wherein the initiator/monomer molar ratio of components (F) and (G) is set in the range from 0.001 to 0.05 mol %, preferably at 0.008 mol %.

44. The process as claimed in claim 31, wherein reaction stage (b2) is conducted at a temperature which lies within a range of ±10° C. based on the temperature at which component (G) has a half-life of 1 hour.

45. The process as claimed in claim 31, wherein when 2,2'-azobisisobutyronitrile is used as component (G) reaction stage (b2) is conducted at a temperature of 80±10° C.

46. The process as claimed in claim 31, wherein the emulsion polymerization in reaction stage (b2) is conducted without further emulsifiers.

47. A method of applying a coating comprising coating a substrate with a coating comprising the polyurethane/polymer hybrid dispersion of claim 1.

* * * * *